(No Model.)

G. MARPLE.
AUTOMATIC CHECK ROW AND DRILL ATTACHMENT FOR CORN PLANTERS.

No. 265,840. Patented Oct. 10, 1882.

WITNESSES:
Otto Beyer
C. Sedgwick

INVENTOR:
G. Marple
BY Munn & Co.
ATTORNEYS.

UNITED STATES PATENT OFFICE.

GEORGE MARPLE, OF OSAGE CITY, KANSAS.

AUTOMATIC CHECK-ROW AND DRILL ATTACHMENT FOR CORN-PLANTERS.

SPECIFICATION forming part of Letters Patent No. 265,840, dated October 10, 1882.

Application filed April 15, 1882. (No model.)

*To all whom it may concern:*

Be it known that I, GEORGE MARPLE, of Osage City, Osage county, Kansas, have invented a new and Improved Automatic Check-Row and Drill Attachment for Corn-Planters, of which the following is a full, clear, and exact description.

The invention consists of an automatic attachment for working the dropping rod or slide of seed-dropping apparatus or the check-rower or drills, the same being a ratchet attachment to one of the driving-wheels and a sleeve with tappets to work the slide, and a shipper-lever and spring to work the sleeve, combined in a simple and effective arrangement, all as hereinafter more fully described, and pointed out in the claim.

Reference is to be had to the accompanying drawings, forming a part of this specification, in which similar letters of reference indicate corresponding parts in both figures.

Figure 1:
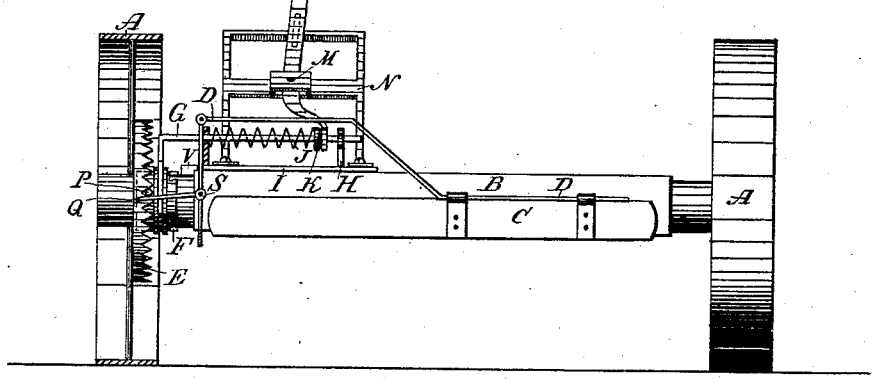
Figure 2:
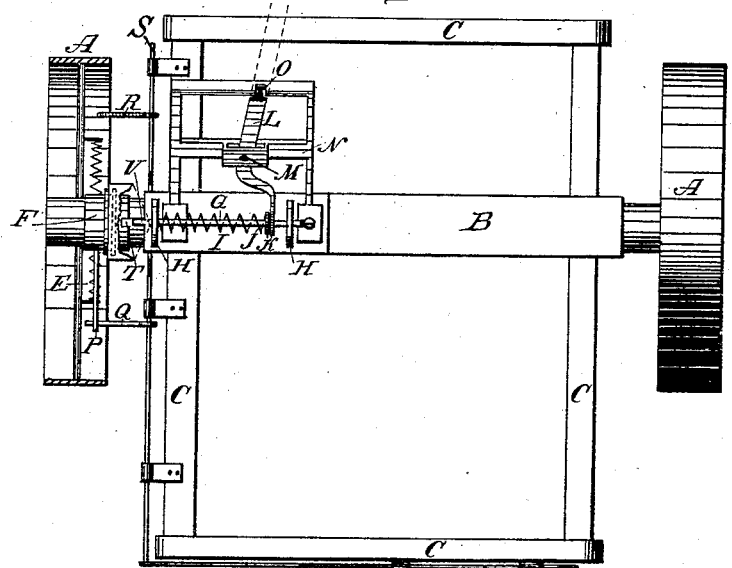

Figure 1 is a sectional elevation of one of the truck-wheels of a seed-dropper, showing the arrangement of the attachment according to my invention in side elevation; and Fig. 2 is a horizontal section of the said wheel, showing the arrangement of the attachment in plan view.

A represents the wheels, B the axle, and C the frame, of a seed-dropper, whereon D represents the rod for working the dropper-slide or the check-rower, which rod I propose to operate by the following means:

E is a ratchet rim or wheel, having teeth in the side and attached to the spokes of one of the truck-wheels A, with its toothed side toward the truck-frame.

F is a sleeve fitted on the axle inside of this ratchet-wheel E, so that the axle can turn freely in said sleeve.

G is a forked shipper-bar, having its fork engaged with the sleeve, so as to control its position on the axle, but allowing it to revolve freely, said bar extending along the axle in bearings H of a base attached to the axle, in which bearings said bar is supported, with a spring, J, coiled around it and bearing against the collar K of said bar G so as to shift the sleeve out of gear with the ratchet E.

L is a lever for shifting the sleeve into gear with the ratchet E, said lever being pivoted at M to a frame, N, attached to base-plate I, and having a notch, O, in the top to hold the shipper-lever when said lever has shifted the sleeve into gear with the ratchet. This sleeve F carries a tappet-arm, P, by which it is geared with the ratchet E when the sleeve is thrust forward by the shipper-lever L, and also by which it throws the crank-rod S to work the dropper-slide D, said tappet-arm acting alternately on the arms Q and R of the said rod S.

The attachment consisting of the ratchet E, tappet-sleeve F, and tappet, and the shipper apparatus and base-plate can be applied readily to different seed-droppers, not only for working the check-rower, if desired, but it may be used for drills. The sleeve F may have one or more tappet-arms, according to circumstances. The said sleeve F has a notch, T, and the base-plate is provided with a stud, V, with which the notch of the sleeve engages when shifted out of gear with the ratchet-wheel to stop the rotation of the sleeve in case any dust should collect in the sleeve and produce friction, to continue its rotation after the sleeve is detached from the ratchet. For using the sleeve for a drill, three arms will be attached to act directly upon the ground.

Having thus described my invention, I claim as new and desire to secure by Letters Patent—

The combination, with the ratchet E, the crank-rod S, provided with arms Q R, and the base-plate I, provided with the stud V, of the sleeve F, provided with one or more tappets, P, and notch T, the lever L, the bar G, and spring J, substantially as and for the purpose set forth.

GEORGE MARPLE.

Witnesses:
J. E. D. WILLIAMSON,
GEO. W. HENDERSON.